United States Patent

Kleinhoffer et al.

[11] Patent Number: 5,806,619
[45] Date of Patent: Sep. 15, 1998

[54] SYSTEM FOR PROVIDING ELECTRICAL GROUND PATH AND SHIELDING ELECTROMAGNETIC WAVES EMITTED FROM AN ENGINE COMPARTMENT

[75] Inventors: Richard Kleinhoffer, Macomb Twp.; Allan Bertrand, Warren; Edward Biegas, Sterling Heights; James E. Van Hout, Auburn Hills; Lee M. Dziekan, Metamora, all of Mich.

[73] Assignee: Chrysler Corporation, Auburn Hills, Mich.

[21] Appl. No.: 681,771

[22] Filed: Jul. 29, 1996

[51] Int. Cl.$^6$ .................................................. B62D 25/10
[52] U.S. Cl. ...................... 180/69.2; 180/69.21; 296/39.3
[58] Field of Search ................................. 180/65.1, 65.8, 180/69.2, 69.21, 69.22, 69.23; 24/290, 713.7; 296/39.3, 210, 211

[56] References Cited

U.S. PATENT DOCUMENTS

| | | |
|---|---|---|
| 1,804,895 | 5/1931 | Stephenson . |
| 4,012,807 | 3/1977 | Kern . |
| 4,029,969 | 6/1977 | Kondo et al. ..................... 180/69.21 X |
| 4,366,598 | 1/1983 | Harasaki et al. . |
| 4,727,621 | 3/1988 | Emery et al. . |
| 4,839,941 | 6/1989 | Orlando . |
| 4,952,006 | 8/1990 | Willey ..................................... 180/69.2 |
| 5,164,254 | 11/1992 | Todd et al. . |
| 5,687,453 | 11/1997 | Megregian et al. ...................... 16/221 |

FOREIGN PATENT DOCUMENTS 62-273168  5/1986  Japan .

*Primary Examiner*—Brian L. Johnson
*Assistant Examiner*—Tyrone M. Lee

[57] ABSTRACT

A system for shielding electromagnetic waves, slowing radiant heat transfer, and attenuating mechanical noise emitted from within an engine compartment and a grommet for establishing an electrically conductive path from a hoodliner's conducting layer to ground. Provided in the present system is a hoodliner that has an electrically conducting material layer for shielding electromagnetic waves, and a fibrous material layer attached to the conducting material for slowing radiant heat transfer and attenuating mechanical noise emitted from the engine compartment.

8 Claims, 2 Drawing Sheets

SYSTEM FOR PROVIDING ELECTRICAL GROUND PATH AND SHIELDING ELECTROMAGNETIC WAVES EMITTED FROM AN ENGINE COMPARTMENT

BACKGROUND

1. Field of the Invention

In general, the present invention relates to the electrical shielding of engine compartments. Specifically, the present invention relates to a system for shielding electromagnetic waves, slowing radiant heat transfer, and attenuating mechanical noise emitted from a vehicle's engine compartment. Further, a grommet is provided for establishing a conductive path to electrical ground.

2. Description of the Related Art

The automotive industry has long sought to increase fuel economy in vehicles. One of the primary ways of accomplishing this is to decrease the weight of the vehicle by using lighter materials of comparable strength. To decrease weight, non-metallic hoods are commonly used. These types of hoods, however, do not have inherent shielding capabilities for electromagnetic waves, allow for slowing of radiant heat transfer, or attenuation of mechanical noise emitted from the engine compartment. To slow radiant heat transfer and attenuate mechanical noise, a fibrous insulating material can be attached between the vehicle's hood and the engine compartment. To shield electromagnetic waves, non-conductive hoods require an electrically conductive layer that is affixed to a surface of the hood, either by direct application to the surface, as in conductive paint, or by application of a sheet of thin conducting material. Typically, application of conductive paint has been a very expensive process with draw backs such as application difficulties and scratch sensitivities. Application of foil to the under side of the hood is currently the preferred method of shielding electromagnetic waves from passing through the non-conductive hood and possibly interfering with radio operation or other electrical components disposed in the instrument panel of the vehicle. One of the challenges of the foil application approach is to successfully interconnect the foil to the body of the vehicle in such a manner as to ensure electrical ground path integrity. Difficulties have been caused in application because the thickness of the foil is typically thin. The foil can therefore be scratched or cut in the installation process breaking the conductivity of the electrical path to the engine compartment.

Conventional design approaches connect the foil to the vehicle body by use of a ground strap. The ground strap is screwed to the body of the vehicle and affixed to the foil by a grommet that is surrounded by the foil. The grommet is loosely attached to the foil so that the grommet will not cut through the thin foil and destroy the electrical ground connection.

This conventional technique, which utilizes ground straps and loose grommets, has many drawbacks. The additional part required by the ground strap is expensive and creates added installation steps. The ground strap also adds to clutter in the engine compartment that is aesthetically unpleasing, and is a concern for engine development and design. The routing and service loop required to make a moving ground strap function is difficult to achieve. The manufacturing process of crimping a grommet onto foil is very difficult to control because the tightness of the crimp is dependent upon many manufacturing variables, which vary with machine wear, and grommet and conducting foil tolerances. The connection of the grommet is critically sensitive to either being too loose or too tight. If the grommet is attached tightly it will cut through the foil and cause an electrical discontinuity. If the grommet is attached loosely the ground connection can become intermittent because of induced vibrations encountered during driving conditions. A loose grommet condition can also allow the ground strap terminal to rotate and can sever the foil adjacent to the perimeter of the grommet.

SUMMARY OF THE INVENTION

The present invention eliminates the disadvantages inherent in the prior art by providing a system for shielding electromagnetic waves, slowing radiant heat transfer, and attenuating mechanical noise emitted from within the engine compartment and a grommet for establishing a continuous electrically conductive path from a conducting layer to electrical ground. Provided in the present system is a hoodliner that has an electrically conducting material layer for shielding electromagnetic waves, and a fibrous material layer attached to the conducting material for slowing radiant heat transfer and attenuating mechanical noise emitted from the engine compartment. Moreover, a clutch grommet is disposed in the hoodliner and extends through the electrically conducting material. A conductive hinge is attached to the vehicle body. An electrically conductive screw inserted through the grommet and an upper portion of a conductive hinge completes the connection and electrically conductive path between the vehicle body and the conducting material.

The present invention provides the following advantages and objects such as lessened cost because additional parts such as ground straps are not needed; moreover negative impacts on the aesthetics of the engine compartment environment are not created; a special clutch grommet mitigates the manufacturing concerns of both tool wear and tolerance variation of the grommet and the foil; the special clutch grommet design also utilizes forgiving geometry and material spring back creates a constant electrical force contact condition between the grommet and the foil.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
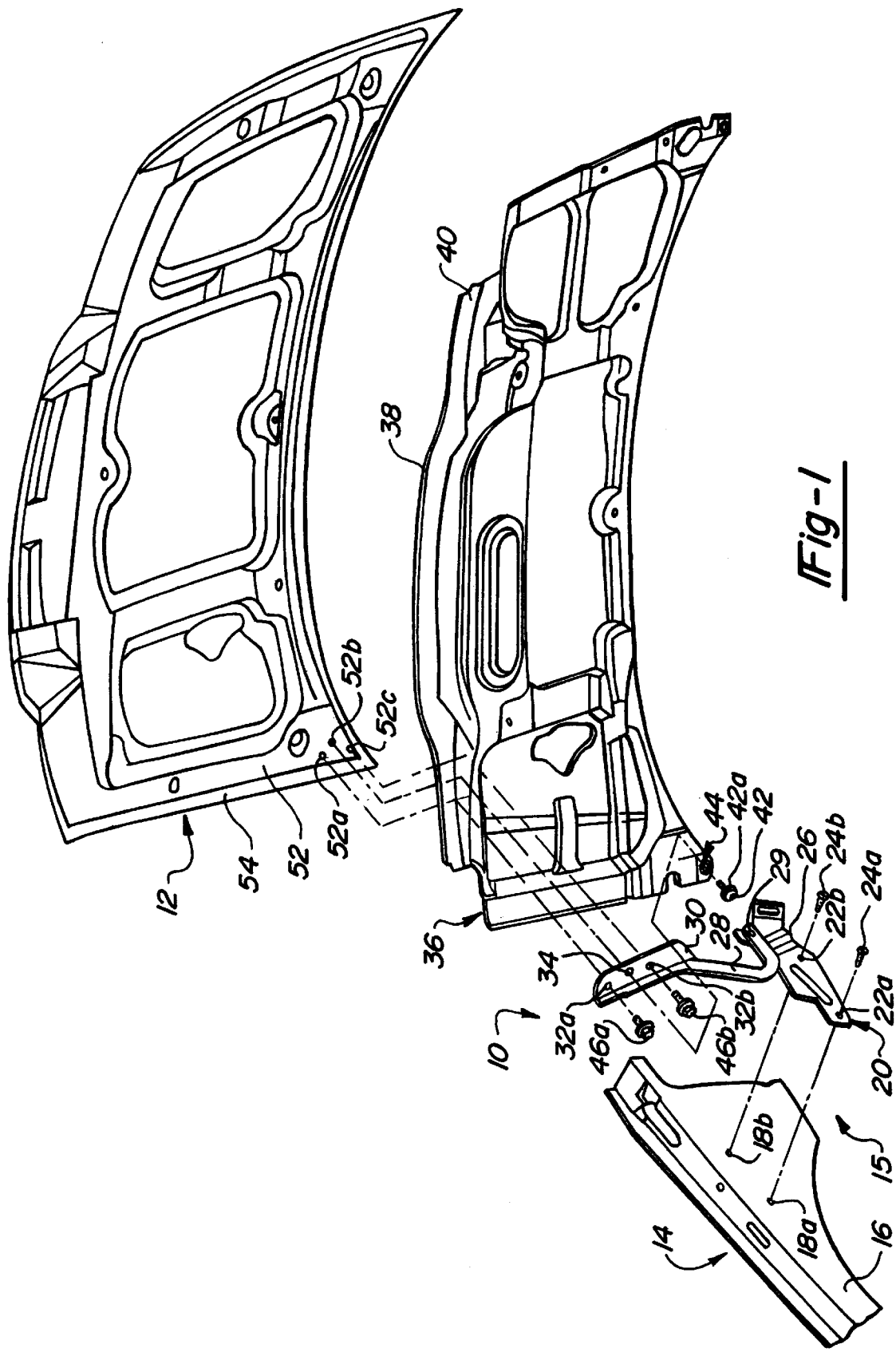
FIG. 1 is an exploded view of the system of the present invention.
Figure 2:
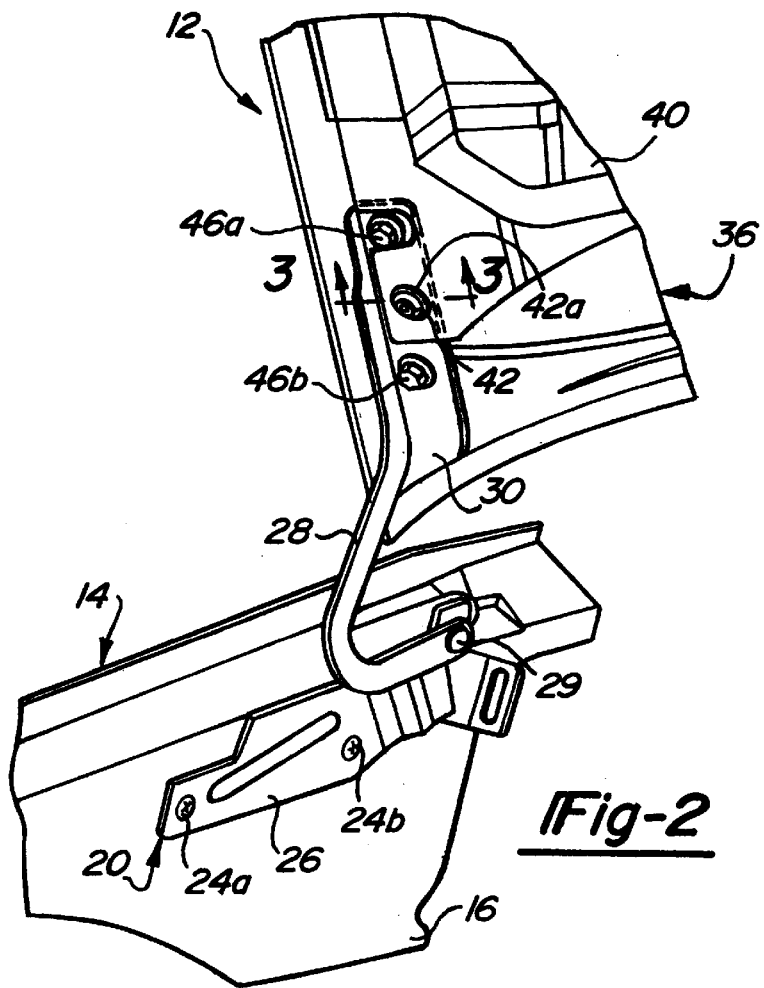
FIG. 2 is a perspective view of a conductive hinge and screw installed in the engine compartment of a vehicle of the present invention.

Commencing with FIG. 1, a system 10 for providing a conductive path to electrical ground from a vehicle's engine compartment 15 and also shielding electromagnetic waves and radiant heat emitted therefrom, is shown. The system 10 comprises a non-electrically conductive hood 12 that has a first molded layer 52 and a second molded layer 54. A body member 14 of the vehicle is also shown. The body member 14 of the vehicle includes a side wall 16 of the engine compartment that has two retention apertures 18a and 18b for receiving screws 24a and 24b therein. The system 10 also comprises a electrically conductive hinge 20 that is attached to the side wall 16 of the vehicle and has two apertures 22a and 22b disposed therein, which spatially correspond to apertures 18a and 18b of the side wall 16 of the vehicle. The hinge 20 has a lower portion 26 that is attached to an arcuate hinge arm 28 by an electrically conductive hinge pin 29 that is inserted through apertures in the lower portion of the hinge 26 and hinge arm 28. The electrically conductive hinge 20 further has an upper portion 30 that has apertures 32a and 32b disposed therein. As shown in FIG. 2, the apertures 32a and 32b are adapted to receive screws 46a and 46b, which are inserted through the apertures 32a and 32b and into apertures 52a and 52b respectively that are disposed in a non-electrically conductive vehicle hood 12. The hoodliner 36 allows for shielding of electromagnetic waves, slowing of radiant heat transfer, and attenuation of noise emitted from the engine compartment 15. The hoodliner 36 is comprised of a fibrous material 40 that is bonded to an electrically conductive material 38.

The fibrous material 40 slows radiant heat transfer, and attenuation of noise emitted from the engine compartment 15. The conductive material 38 of the hoodliner 36 is attached to the hood 12 of the vehicle via screws or can be formed fit and bonded to the hood 12. The conductive material 38 shields electromagnetic waves emitted from the engine compartment 15.

Figure 3:
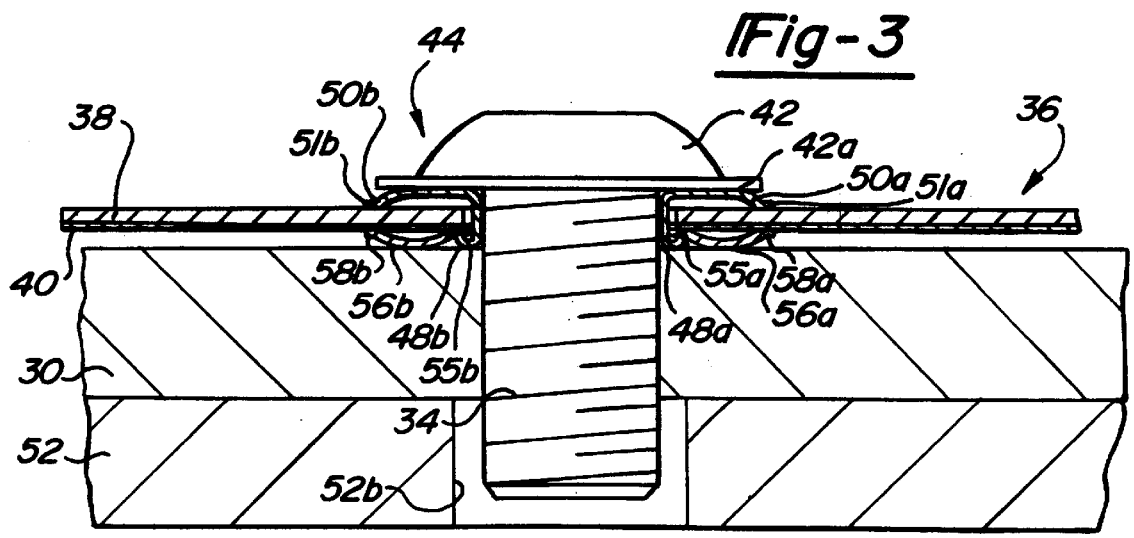
FIG. 3 is a cross-sectional view taken along sight line 3—3 of FIG. 2 of the present invention showing a clutch grommet and the conductive screw of the present invention.

The present system 10 also comprises an electrically conductive screw 42 that has a radial flange 42a integrally formed therewith. When attached to the vehicle, the screw 42 is inserted through an electrically conductive clutch grommet 44 and further through a grommet retention aperture 34 of the upper portion 30 of hinge 20. Shown in FIG. 2, the electrically conductive hinge 20 is attached to the side 16 of the engine compartment is at its lower portion 26 and also to the hoodliner 36 at its upper portion 30 via screw 42 that is inserted through grommet 44 that is disposed in portion 30, aperture 34, and further into aperture 52b of the non-conductive hood 12. Referring to FIG. 3, the clutch grommet 44 of the present invention is shown in greater detail. The conductive screw 42 is shown inserted through the grommet 44 and also through aperture 34 of the upper portion 30 of the electrically conductive hinge 20. The grommet 44 is self threaded into the aperture 34 thereby creating continuous contact between the grommet 44 and conductive material 40.

As further shown in FIG. 3, the clutch grommet 44 is comprised of a radial, arcuate sheer offset member 50a and 50b that terminates in a down turned portion 51a and 51b at a first end and in a J-hook portion 48a and 48b at a second end. The down turned portion 51a and 51b and the J-hook portion 48a and 48b both extend radially outward from the grommet 44. The down turned portion 51a and 51b is in radially abutment with a non-electrically conductive, fibrous material 38 of the hoodliner 36. The sheer offset member 50a and 50b is in contact, or radial abutment with, the radial flange 42a of the conductive screw 42. The grommet 44 further comprises a radially flared cross-member 56a and 56b that terminates in an upturned portion 58a and 58b at a first end and terminates in a crimped portion 55a and 55b at a second end. The crimped portion 55a and 55b is in engagement with the J-Hook portion 48a and 48b of the sheer relief 50a and 50b. The upturned portion 58a and 58b is in radially abutment with the electrically conductive material 40 of the hoodliner 36, while the cross-member 56a and 56b is in radial abutment with the upper portion 30 of the electrically conductive hinge 20. During installation there is a slight bending of the resilient hoodliner 36 when the grommet 44 is inserted therein, which creates a constant force contact between the radially upturned portion 58a and 58b of the grommet 44 and the conductive material 40. A sheer relief offset is created at the engagement of the J-hook portion 48a and 48b of grommet 44 and the crimped portion 55a and 55b that in the manufacturing process is created by offset dye footprints, which are calibrated to allow clearance for the hoodliner 36 to be received by the grommet 44. The sheer relief offset prevents damage to the conductive material that could be created by either over or under tightening of the grommet 44 during the manufacturing process. The engagement of the J-hook portion 48a and 48b with the crimped portion 55a and 55b allow for the grommet 44 to rotate during installation without tearing the relatively thin conductive material 40. Further such engagement also prevents any intermittency of the electrical ground path when road vibrations are encountered in the vehicle during driving conditions.

The ground path of the present system 10 is as follows: the foil 40 is in contact with the radially upturned cross member 58a and 58b of the grommet 44 at a first end. The is second end crimped portion 55a and 55b is in engagement with the J-hook portion 48a and 48b, which is integrally formed with sheer offset member 50a and 50b. The radial flange 42a of the conductive screw 42 is in contact with the grommet 44 at member 50a and 50b and further is threadingly screwed into the aperture 34 of the upper portion 30 of the conductive hinge 20. The upper portion 30 is attached to the hinge arm 28, which is connected to the lower portion 26 of then conductive hinge 20 by the conductive pin 29. The lower portion 26 of the conductive hinge 20 is attached to the side 16 of the vehicle.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A system for establishing a continuous electrically conductive path from an electrically conductive hoodliner to ground, the system comprising:

an electrically conductive hinge comprising:
an electrically conductive lower portion attached to a wall of an engine compartment,
an electrically conductive hinge arm,
an electrically conductive hinge pin swivelably connecting the lower portion of the hinge with the hinge arm,
an electrically conductive upper portion attached to a non-electrically conductive hood of the vehicle, and
a grommet retention aperture disposed within the upper portion of the hinge;

the hoodliner comprising:
a fibrous material layer for slowing radiant heat transfer, and attenuating mechanical noise emitted from within the engine compartment, and
an electrically conducting material layer bonded to the fiberous material, the conducting material providing a shield against electromagnetic waves emitted from the engine compartment;

a grommet extending through and is in contact with the electrically conducting material; and an electrically conductive screw extending through and in contact with the grommet, and the grommet retention aperture of the upper portion of the hinge to complete an electrically conductive path from the electrically conductive material of the hoodliner to ground.

2. The system for establishing a continuous electrically conductive path from an electrically conductive hoodliner to ground of claim 1 wherein the grommet extends through and is in contact with the electrically conducting material and the fibrous material layer.

3. The system for establishing a continuous electrically conductive path from an electrically conductive hoodliner to ground of claim 1 wherein the grommet provides for bending of the hoodliner to create constant contact between a downward angled portion of the grommet and the conducting material layer.

4. A system for establishing a continuous electrically conductive path from an electrically conductive hoodliner to ground, the system comprising:

an electrically conductive hinge comprising:
an electrically conductive lower portion attached to a wall of an engine compartment,
an electrically conductive hinge arm,
an electrically conductive hinge pin swivelably connecting the lower portion of the hinge with the hinge arm,
an electrically conductive upper portion attached to a non-electrically conductive hood of the vehicle, and
a grommet retention aperture disposed within the upper portion of the hinge;

the hoodliner comprising:
a fibrous material layer for slowing radiant heat transfer, and attenuating mechanical noise emitted from within the engine compartment, and
an electrically conducting foil material layer bonded to the fibrous material and abutting against the hood of the vehicle, the conducting foil material layer providing a shield against electromagnetic waves emitted from the engine compartment;

a grommet extending through and in contact with the electrically conducting foil material, the grommet providing for bending of the resilient hoodliner to create constant contact between a downward angled portion of the grommet and the foil material layer; and an electrically conductive screw extending through and in contact with the grommet, and the grommet retention aperture of the upper portion of the hinge to complete an electrically conductive path from the electrically conductive foil material of the hoodliner to ground.

5. The system for establishing a continuous electrically conductive path from an electrically conductive hoodliner to ground of claim 4 wherein the grommet further comprises an arcuate, radially extending sheer relief offset member that terminates in a down turned portion at a first end and terminates in a J-hook portion at a second end, the down turned portion being in radial abutment with the fibrous material of the hoodliner.

6. The system for establishing a continuous electrically conductive path from an electrically conductive hoodliner to ground of claim 5 wherein the grommet further comprises a radially extending flared cross member that terminates in an upturned portion at a first end and terminates in a crimped portion that is in engagement with the J-hook portion of the sheer relief offset at a second end, the upturned portion being in radial abutment with the electrically conductive material of the hoodliner, and the cross member being in radial abutment with the upper portion of the electrically conductive hinge of the vehicle.

7. A clutch grommet included in combination with a hoodliner and hinge assembly for a vehicle comprising:

an arcuate, radially extending sheer relief offset member that terminates in a down turned portion at a first end and terminates in a J-hook portion at a second end, the down turned portion being in radial abutment with a fibrous material layer of a vehicle hoodliner; and a radially extending flared cross member that terminates in an upturned portion at a first end and terminates in a crimped portion that is in engagement with the J-hook portion of the sheer relief offset at a second end, the upturned portion being in radial abutment with an electrically conductive material layer of the hoodliner, and the cross member being in radial abutment with an upper portion of an electrically conductive hinge of the vehicle.

8. The clutch grommet included in combination with a hoodliner and hinge assembly for a vehicle of claim 7 wherein the radially extending sheer relief offset member is in abutment with an electrically conductive screw.

* * * * *